Patented June 5, 1951

2,555,407

UNITED STATES PATENT OFFICE 2,555,407

POLYMERIZATION OF VINYL CHLORIDE IN AN AQUEOUS HOCl—Cl$_2$—H$_2$SO$_3$ SYSTEM

Archie Hill, Painesville, and Ward J. Burkholder, Thompson, Ohio, assignors to Diamond Alkali Company, Cleveland, Ohio, a corporation of Delaware No Drawing. Application June 14, 1950, Serial No. 168,158

6 Claims. (Cl. 260—92.8)

This invention relates to a method for rapidly polymerizing vinyl chloride monomer to high molecular weight polymerizates, and more particularly relates to a method for emulsion polymerization of vinyl chloride in an aqueous redox system, in which the polymerization initiators are sulfites and a mixture of hypochlorous acid and elemental chlorine.

It has heretofore been proposed to polymerize vinyl chloride emulsified in an aqueous redox system containing sulfites and sodium hypochlorite. It has, however, been found by experimentation that when the aqueous redox system, in which vinyl chloride is emulsified, is sufficiently alkaline to preclude substantial decomposition of sodium hypochlorite, the initiating effect of the sodium hypochlorite therein is very indefinite in that polymerization, while it is initiated to some small extent, is soon terminated and extremely low yields of polymerizate result, for example, yields of the order of 1%. Prior art workers have attributed the low yield and the indefinite effect of the hypochlorite upon redox systems containing sulfites to the high speed of oxidation of the sulfites and reduction of the sodium hypochlorite, resulting in a rapid elimination of the activator.

It is also known that in aqueous solutions, sodium hypochlorite undergoes substantial chemical changes as the alkalinity of such solutions decreases toward neutrality, and that sodium hypochlorite introduced into acid solutions forms hypochlorous acid and mixtures of elemental chlorine and hypochlorous acid, which may undergo further decomposition ultimately to hydrogen chloride and elemental chlorine as the acidity increases and the pH decreases to about 1–2. Further, it is known that as the pH of a solution of sodium hypochlorite is reduced from a relatively high value, for example, 10–11, to a relatively low value, for example, 1–2, such sodium hypochlorite is decomposed and its various decomposition products exhibit several sharply defined degrees of oxidative activity. Thus, in solutions of sodium hypochlorite in which the pH is reduced from approximately 9–10 to approximately 7, a maximum rate of oxidative activity is reached at pH 7, and at pH values on either side of pH 7, the curve of the rate of oxidative attack passes over plateaus of relatively low activity values, as well as over peaks of somewhat lesser magnitude than that attained at pH 7.

It has now been found that in contrast to the prior art teachings, the acid decomposition products of sodium hypochlorite, which exist in the region of one of these plateaus of relatively low oxidative reactivity on the above-mentioned curve, at pH values within the range of 2.5–5.5, i. e., the region of the pH range in which sodium hypochlorite is decomposed to a mixture of hypochlorous acid and elemental chlorine, have been found extremely effective in initiating sulfite-redox catalyzed polymerization of vinyl chloride monomer to give high molecular weight polymerizates within an unusually short reaction period. Further, it has been found that while the region of relatively low oxidative reactivity in the lower pH range readily catalyzes the polymerization of vinyl chloride when used in an aqueous sulfite-redox system, a redox system comprising sodium hypochlorite and a sulfite salt at pH values above pH 7, at which values the oxidative reactivity of sodium hypochlorite is of the same order of magnitude as that obtained at the lower pH's noted hereinabove, is substantially wholly ineffective to initiate polymerization of vinyl chloride to any commercially feasible extent even over long periods of time.

Accordingly, the present invention is directed to a method for rapidly polymerizing vinyl chloride monomer to high molecular weight polymerates, which includes the steps of contacting monomeric vinyl chloride dispersed in an aqueous acidic medium with hypochlorous acid, chlorine, and sulfurous acid, maintaining the pH of said medium substantially within the range of 2.5–5.5 until the polymerization reaction is substantially complete, and recovering a polymerizate from said medium.

In general, in practicing the method of the present invention for batch polymerization, it is preferable first to prepare the aqueous dispersion medium by providing an adequate amount of water in a suitable closed system, adding the emulsifier and the sulfite salt thereto, subsequently adding the vinyl chloride monomer, then adding the sodium hypochlorite to the system, and agitating the mixture of reactants during the polymerization period. As noted hereinabove, in accordance with the method of the present invention the pH of the aqueous medium is maintained throughout the polymerization reaction period at a value within the range of 2.5–5.5. In order to effect pH control during the polymerization reaction period, it is preferable to employ in conjunction with the sulfite salt, emulsifier, and sodium hypochlorite, a suitable buffer for maintaining the pH within this range. Buffers which have been found suitable for the purposes herein include acetic acid-sodium acetate, the universal buffer of Britton & Robinson ("Hydrogen Ions," Britton, 2nd ed., page 225) consisting of acetic acid-phosphoric acid-boric acid-NaOH, and the like.

Moreover, in accordance with the present invention, as applied to the batch method of emulsion polymerization of vinyl chloride, it has been found desirable to maintain the ratio of the vinyl chloride monomer to the aqueous phase within the range of 1:1–3, preferably, however, within the range of 1:2–3, and to employ an amount of emulsifier within the range of 0.5%–2% of the weight of the monomer. Emulsifiers which have been found suitable in the method of the present invention include alkyl sulfates, alkyl aryl sulfonates, quaternary ammonium compounds, and the like, but alkyl sulfates having from 12–14 carbon atoms in the alkyl chain are preferred. The reason for the preference of the alkyl sulfate emulsifiers, particularly the alkyl sulfates in which the alkyl chain contains from 12–14 carbon atoms, is that they are readily available commercially in a relatively high state of purity. The purity of the emulsifier is of significance in any emulsion polymerization system since it has long been known that where such emulsifiers contain substantial amounts of olefinic alkyl chains, particularly the conjugated olefinic alkyl chains, or where the alkyl chain bears tertiary hydrogen, either of which may be present in certain of the alkyl aryl sulfonates, such compounds are responsible for terminating the polymerization of vinyl chloride relatively early in the polymerization reaction period.

The concentrations of elemental chlorine and hypochlorous acid at the pH range required by the method of the present invention, and the concentration of sulfite ions in the aqueous medium of the redox system may be provided in any suitable manner. Thus, for example, chlorine and hypochlorous acid may be obtained first by the expedient of the chemical combination of chlorine with caustic soda to form sodium hypochlorite, followed by adding the hypochlorite to a buffered acid solution. In general, the sodium hypochlorite solution preferably contains from 4% to 6% of available chlorine and, moreover, contains a relatively small amount of free caustic soda. This means of introducing the necessary amounts of chlorine and hypochlorous acid into the redox system is especially desirable in the batch method of emulsion polymerization, since it provides for a relatively stable source of polymerization initiators in a form in which they may be stored over relatively long periods of time.

It has also been found that gaseous chlorine introduced into the aqueous medium of a redox system containing a suitable sulfite ion concentration, and buffered to the proper pH within the above-noted range, may also be used. This latter means of providing elemental chlorine and hypochlorous acid at the desired pH is particularly well-suited to a continuous method for the polymerization of vinyl chloride in accordance with the method of the present invention, since the adjustment of the concentrations of both the chlorine and the sulfite introduced into such aqueous phase is readily effected continuously. In either of the above-described means for providing elemental chlorine and hypochlorous acid in conjunction with the sulfite ions in the aqueous medium of the redox system, it is preferable to provide an amount of sulfite, such as sodium sulfite or sodium meta bisulfite, in molar excess of the amount of available chlorine calculated as sodium hypochlorite. Where sodium hypochlorite is used as the source of the polymerization reaction initiator in the redox system, the amount thereof to be used, in terms of the amount of monomer employed, is preferably within the range of 0.1%–1% by weight, and the amount of sodium meta bisulfite to be used is within the range of 0.25%–2.5% by weight of the monomer. This concentration of sodium hypochlorite and sodium meta bisulfite gives a molar ratio of one sodium hypochlorite to one to three sodium meta bisulfite.

Sulfur dioxide and gaseous chlorine may be used as the sources of polymerization reaction initiators, such as in a continuous method for the polymerization of vinyl chloride in accordance with the method herein, and in such case the ratio of chlorine to sulfur dioxide is preferably within the range of 1:1.8–5.4, the weight of the two ingredients in terms of the monomer being in proportion to the amounts of sodium hypochlorite and sodium meta bisulfite stated hereinabove.

The temperature at which the polymerization of the vinyl chloride is carried out, either by the batch method or by the continuous method, is preferably within the range of 25–45° C., more suitably of the order of 40° C., it having been found that temperatures substantially above 40° C. increase the rate at which the vinyl chloride is polymerized but decrease the average molecular weight of the polymer molecules, whereas temperatures substantially below 25° C. increase the average molecular weight of the polymer molecules somewhat but extend the reaction time of the polymerization beyond that desirable either in the continuous method or the batch method for a high production rate of polymer. Thus, it has been found in accordance with the method of the present invention that where the polymerization is carried out at temperatures within the above preferred range, more suitably at temperatures of the order of 40° C., a high molecular weight polymer of the order of 100,000–110,000 may be obtained in a matter of one to three hours, generally of the order of one to two hours, and at a conversion efficiency within the range of 70%–90%.

In order that those skilled in the art may better understand the method of the present invention and in what manner the same may be carried into effect, the following specific examples are offered:

In all of the following examples the ratio of vinyl chloride monomer to the aqueous phase is 100 parts: 300 parts, by weight, and the amount of emulsifier (commercial lauryl sulfate, purified to remove $Na_2SO_4$ and polymerization inhibitors) is 1% by weight of monomer. The average temperature of the polymerization reaction mass is controlled by agitating the reaction mass during the polymerization reaction period substantially at the temperature indicated in the examples. Sodium hypochlorite is used as the source of the mixture of hypochlorous acid and elemental chlorine in the aqueous redox system as a matter of convenience and ease of control in obtaining the desired concentration of the oxidizing and reducing agents and simplicity in showing the effect of changes in the range of concentration of these ingredients, as well as changes in the pH of the aqueous medium.

The molecular weight determinations, the results of which are reported in the tables below, are made by means of viscosity measurements in which the viscosity of a solution containing 1 gm. of the polymerizate per 100 mls. of solvent (cyclohexanone) is determined in a modified "Ostwald" viscosimeter tube with the tube immersed in a constant temperature bath operating at 25° C.

Example I

An aqueous phase of a redox system for the polymerization of vinyl chloride is prepared by combining the requisite amount of water and emulsifier with 0.767 part of sodium meta bisulfite ($Na_2S_2O_5$), freezing the same in a closed system at a temperature slightly below that of the boiling point of vinyl chloride. There is added to the frozen mass the requisite amount of vinyl chloride monomer and 0.27 part of sodium hypochlorite (in the form of an aqueous solution of chlorine in caustic soda containing 15.4 gms. of NaOCl gms. per liter). The system is again closed and the reactants brought to a temperature of 30° C. with agitation, and the following results are obtained:

| pH | | Time (Hrs.) | Per Cent Conversion | Molecular Weight |
|---|---|---|---|---|
| Initial | Final | | | |
| 4.35 | 3.00 | 1.5 | 66 | |
| 4.35 | 3.20 | 2 | 85 | 109,600 |

Example II

In this example the amounts of sodium hypochlorite and sodium meta bisulfite are the same as those employed in Example I above. The aqueous phase is buffered with Britton & Robinson's universal buffer containing phosphoric acid, acetic acid, and boric acid, with the requisite amount of caustic soda added thereto to obtain the desired pH, as shown in the table below:

| Part | | pH | | Time (Hrs.) | Per Cent Conversion | Molecular Weight |
|---|---|---|---|---|---|---|
| NaOCl | $Na_2S_2O_5$ | Initial | Final | | | |
| 0.276 | 0.787 | 3.0 | 3.16 | 1 | 50 | |
| | | | 3.17 | 1.75 | 79 | 101,500 |
| 0.276 | 0.787 | 5.0 | 4.79 | 4.25 | 76 | |
| | | | 4.80 | 5 | 90 | 107,100 |
| 0.276 | 0.787 | 7.0 | 6.87 | 19 | 26.3 | 115,900 |
| 0.276 | 0.787 | 4.0 | 4.01 | 1.75 | 75.4 | |
| | | | 4.00 | 2 | 82 | 108,000 |

All of the above polymerizations were carried out at a temperature of 40° C.

Example III

| Part | | pH | | Time (Hrs.) | Per Cent Conversion | Molecular Weight |
|---|---|---|---|---|---|---|
| NaOCl | $Na_2S_2O_5$ | Initial | Final | | | |
| 0.413 | 1.054 | 4.0 | 4.08 | 1.5 | 79 | |
| | | | 4.10 | 1.67 | 86 | 105,000 |
| 0.206 | 1.054 | 4.0 | 4.11 | 1.75 | 69 | |
| | | | 4.10 | 2 | 81 | 106,000 |
| 0.138 | 0.984 | 4.0 | 4.0 | 1.75 | 58 | |
| | | | 4.02 | 2.6 | 83 | 108,000 |

All of the above polymerizations were carried out at a temperature of 40° C.

Example IV

In this example the aqueous phase of the redox emulsion polymerization system is buffered with Britton & Robinson's universal buffer containing phosphoric acid, acetic acid, and boric acid, with the requisite amount of caustic soda added thereto to give the desired pH, as noted in the table below:

| Part | | pH | | Time (Hrs.) | Per Cent Conversion | Molecular Weight |
|---|---|---|---|---|---|---|
| NaOCl | $Na_2S_2O_5$ | Initial | Final | | | |
| 0.276 | 0.787 | 2.0 | 2.00 | 1.25 | 34 | |
| | | | 2.02 | 4 | 41 | 109,700 |
| 0.276 | 0.787 | 4.0 | 4.0 | 2.25 | 86 | |
| | | | 4.05 | 2.4 | 88 | 101,700 |
| 0.276 | 0.787 | 6.0 | 5.68 | 5.6 | 24 | |
| | | | 5.62 | 6.5 | 33 | 116,000 |

All of the above polymerizations were carried out at a temperature of 40° C.

While there have been described various embodiments of the invention, the methods described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being inended to cover the invention broadly in whatever form its principle may be utilized.

What is claimed is:

1. The method of rapidly polymerizing vinyl chloride monomer to high molecular weight polymerizates, which includes the steps of contacting monomeric vinyl chloride dispersed in an aqueous acidic medium with hypochlorous acid, chlorine, and sulfurous acid, maintaining the pH of said medium substantially within the range of 2.5–5.5 until the polymerization reaction is substantially complete, and recovering a polymerizate from said medium.

2. The method of rapidly polymerizing vinyl chloride monomer to high molecular weight polymerizates, which includes the steps of providing an aqueous acidic medium including a mixture of hypochlorous acid, chlorine, sulfurous acid, and an emulsifier chemically inert to said acids and said chlorine in said medium, dispersing liquid monomeric vinyl chloride in said medium, subjecting the system including said medium and said vinyl chloride to autogenous pressure during the polymerization reaction period, maintaining the pH of said medium substantially within the range of 2.5–5.5 during said reaction, and recovering a polymerizate from said medium.

3. The method of rapidly polymerizing vinyl chloride monomer to high molecular weight polymerizates, which includes the steps of providing an aqueous acidic medium including a mixture of sulfurous acid, an acid buffer composition sufficient to maintain the pH of said medium within the range of 2.5–5.5 during the polymerization, and an emulsifier, adding monomeric vinyl chloride and a source of hypochlorous acid and chlorine to said medium, subjecting the system including said medium and said vinyl chloride to autogenous pressure during the polymerization thereof at a temperature substantially within the range of 25°–45° C., and recovering a polymerizate from said medium.

4. The method of claim 3 in which said hypochlorous acid and said chlorine are derived from sodium hypochlorite and said sulfurous acid is derived from sodium meta bisulfite, the molar ratio of said sodium hypochlorite to said sodium meta bisulfite being within the range of 1:1–3.

5. The method of claim 4 in which the total of said sodium hypochlorite and said sodium meta bisulfite amounts to 0.35%–3.5% of the weight of said monomeric vinyl chloride dispersed in said medium.

6. The method of claim 4 in which said hypochlorous acid is derived from elemental chlorine and said sulfurous acid is derived from sulfur dioxide in a molar ratio within the range of 1:1.8–5.4.

ARCHIE HILL.
WARD J. BURKHOLDER.

No references cited.